United States Patent
Yamamoto et al.

[11] Patent Number: 6,108,599
[45] Date of Patent: *Aug. 22, 2000

[54] VEHICLE STEERING CONTROL SYSTEM

[75] Inventors: Yorihisa Yamamoto; Yutaka Nishi; Takashi Nishimori; Hiroyuki Tokunaga; Hideki Machino, all of Saitama-ken, Japan

[73] Assignee: Honda Giken Kogyo Kabushiki Kaisha, Tokyo, Japan

[ * ] Notice: Under 35 U.S.C. 154(b), the term of this patent shall be extended for 549 days.

[21] Appl. No.: 08/525,844

[22] Filed: Sep. 8, 1995

[30] Foreign Application Priority Data

Oct. 4, 1994 [JP] Japan ................................. 6-264592

[51] Int. Cl.$^7$ ....................................................... G06F 7/00
[52] U.S. Cl. ............................. 701/41; 701/42; 180/446; 180/422; 180/443
[58] Field of Search ..................... 364/424.051, 424.054, 364/423.098, 426.037, 424.049, 424.058, 426.022, 426.025, 424.052, 426.015, 426.016, 550, 426.01; 180/446, 422, 421, 429, 427, 443, 197, 246, 65.1, 402, 417, 442, 415; 280/735

[56] References Cited

U.S. PATENT DOCUMENTS

| | | | |
|---|---|---|---|
| 4,830,127 | 5/1989 | Ito et al. | 364/424.052 |
| 5,078,226 | 1/1992 | Inagaki et al. | 364/424.051 |
| 5,247,441 | 9/1993 | Serizawa et al. | 364/424.051 |
| 5,333,058 | 7/1994 | Shiraishi et al. | 364/426.016 |
| 5,347,458 | 9/1994 | Serizawa et al. | 364/424.051 |
| 5,388,658 | 2/1995 | Ando et al. | 364/426.037 |
| 5,446,660 | 8/1995 | Miichi et al. | 364/424.054 |
| 5,448,482 | 9/1995 | Yamamoto et al. | 364/424.051 |
| 5,481,457 | 1/1996 | Yamamoto et al. | 364/424.051 |
| 5,513,720 | 5/1996 | Yamamoto et al. | 180/141 |
| 5,528,497 | 6/1996 | Yamamoto et al. | 364/424.051 |

FOREIGN PATENT DOCUMENTS 2279304  4/1995  United Kingdom .

Primary Examiner—Jacques H. Louis-Jacques
Attorney, Agent, or Firm—Carrier, Blackman & Associates, P.C.; Joseph P. Carrier; William D. Blackman

[57] ABSTRACT

In a vehicle steering control system, a manual steering input is assisted by a powered actuating steering torque which is given by $K(\gamma - t_d \cdot d\gamma/dt)$, where y is a detected yaw rate, K and $t_d$ are coefficients which depend on a vehicle speed, and d/dt denotes a time derivative. The detected yaw rate contributes to reducing the yaw rate of the vehicle. In particular, the coefficient $t_d$ is positive in value in a low speed range, and substantially linearly decreases with the vehicle speed, becoming negative at a certain intermediate vehicle speed. Thus, in a high speed range, when the vehicle is steered in one direction either by external disturbances or by a manual steering input, the detected yaw rate and the change rate of the yaw rate both contribute to the reduction of the yaw rate. However, in a low speed range, when the vehicle is steered in one direction, the detected yaw rate contributes to the reduction of the yaw rate but the change rate of the yaw rate contributes to the increase of the yaw rate. Thus, in a high speed range, the vehicle is made highly immune against external disturbances and the effort required for the manual steering of the vehicle is increased with the increase in the change rate of the yaw rate. Conversely, in a low speed range, the stability of the vehicle is of no concern, and the effort required for the manual steering of the vehicle is decreased with the increase in the change rate of the yaw rate.

18 Claims, 9 Drawing Sheets

VEHICLE STEERING CONTROL SYSTEM

TECHNICAL FIELD

The present invention relates to a vehicle steering control system, and in particular to a steering control system capable of producing a steering torque that tends to control undesirable behaviors of the vehicle when the vehicle is subjected to crosswind or other external interferences.

BACKGROUND OF THE INVENTION

It has been proposed, for instance in the U.S. patent application Ser. No. 08/122,615 filed Sep. 16, 1993, now U.S. Pat. No. 5,528,497, and assigned to the same Assignee, to initially define a standard yaw rate response model, compare the actual yaw rate response with a standard yaw rate response computed from the standard yaw rate response model, evaluate external disturbances according to the deviation of the actual yaw rate response from the standard yaw rate response, and produce a steering torque with a powered actuator which tends to cancel the deviation. The contents of this copending application are hereby incorporated in the present application by reference. Thus, when the actual yaw rate is smaller than the standard yaw rate, the steering system automatically produces a steering torque which tends to cancel this deviation. Conversely, when the actual yaw rate is greater than the standard yaw rate, a steering torque is produced which tends to somewhat reduce the steering angle. By doing so, the vehicle is made highly resistant against external disturbances which could arise from crosswind and road surface irregularities. Also, the steering effort required by the vehicle operator is kept at an appropriate level at all times.

However, according to this previous proposal, it is necessary to prepare a standard yaw rate model in advance, and continually compare the actual yaw rate response with a standard yaw rate response. This presents a substantial difficulty in designing the control algorithm, and complicates the structure of the control system.

A yaw rate response of a vehicle is typically expressed by a transfer function involving a second-order delay, and the behavior of the vehicle can be favorably controlled by defining the standard yaw rate response model with such a transfer function. However, when the vehicle operator makes a rapid steering maneuver, the resulting transient response may result in an undesirably large deviation between the actual yaw rate and the standard yaw rate, and this may give rise to an unacceptably large steering reaction.

BRIEF SUMMARY OF THE INVENTION

In view of such problems of the previously proposed vehicle steering control system, a primary object of the present invention is to provide an improved vehicle steering control system which can improve the handling of the vehicle in making a turn and control the irregular behaviors of the vehicle at external disturbances without requiring a standard yaw rate model to be initially defined.

A second object of the present invention is to provide a vehicle steering control system which can make the vehicle resistant against external disturbances without compromising the response of the vehicle to a manual steering input.

A third object of the present invention is to provide a vehicle steering control system which can make the vehicle resistant against external disturbances without complicating the control system.

According to the present invention, these and other objects can be accomplished by providing a vehicle steering control system, comprising manual steering torque input means for manually applying a manual steering torque to steerable wheels of a vehicle; powered steering actuator means for applying an actuating steering torque to the steerable wheels of the vehicle; a yaw rate sensor for detecting a yaw rate of the vehicle; and control means for controlling the actuating steering torque according to the detected yaw rate so that the actuating steering torque is dependent on the detected yaw rate and a change rate of the detected yaw rate in such a manner that the detected yaw rate always contributes to the actuating steering torque so as to reduce the detected yaw rate, and the change rate of the detected yaw rate contributes to the actuating steering torque so as to reduce the detected yaw rate in a high speed range but so as to increase the detected yaw rate in a low speed range.

Thus, in a high speed range, when the vehicle is steered in one direction either by external disturbances or by a manual steering input, the detected yaw rate and the change rate of the yaw rate both contribute to the reduction of the yaw rate. However, in a low speed range, when the vehicle is steered in one direction, the detected yaw rate contributes to the reduction of the yaw rate but the change rate of the yaw rate contributes to the increase of the yaw rate. Thus, in a high speed range, the vehicle is made highly immune against external disturbances and the effort required for the manual steering of the vehicle is increased with the increase in the change rate of the yaw rate. Conversely, in a low speed range, the stability of the vehicle is of no concern, and the effort required for the manual steering of the vehicle is decreased with the increase in the change rate of the yaw rate.

According to a preferred embodiment of the present invention, the actuating steering torque is given by $K(\gamma - t_d \cdot d\gamma/dt)$, where $\gamma$ is the detected yaw rate, $K$ and $t_d$ are coefficients which depend on a vehicle speed, and $d/dt$ denotes a time derivative. Preferably, the coefficient $t_d$ is positive in value in a low speed range, and substantially linearly decreases with the vehicle speed, becoming negative at a certain intermediate vehicle speed, while the coefficient $K$ substantially linearly increases with the vehicle speed, and assumes a substantially constant value beyond a certain vehicle speed.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
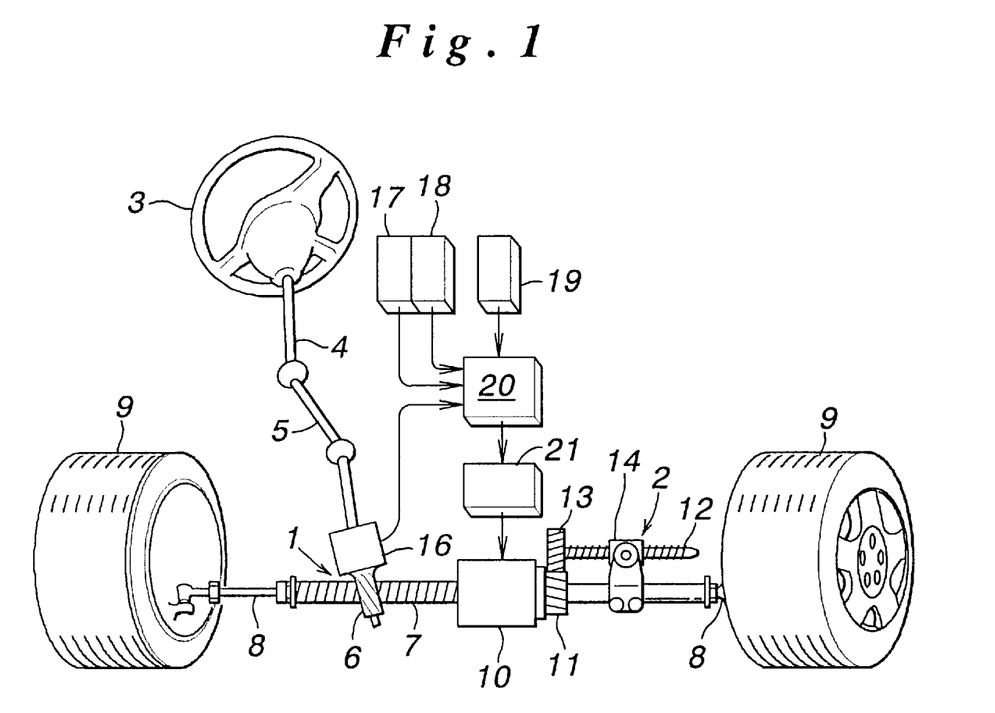
FIG. 1 is a schematic diagram generally illustrating a vehicle steering control system according to the present invention.

FIG. 1 shows the general structure of the vehicle steering system according to the present invention. This device comprises a manual steering force generating unit 1 and an assisting steering force generating unit 2 powered by an electric motor. A steering shaft 4 integrally connected to a steering wheel 3 is connected, at its lower end, to a pinion 6 of a rack and pinion mechanism via a universal joint 5. The rack and pinion mechanism further comprises a rack 7 which can move laterally of the vehicle body and meshes with the pinion 6. The two ends of the rack 7 are connected to the knuckle arms of the right and left front wheels 9 via tie rods 8, respectively. So far the structure is conventional, and the normal steering action based on the use of the rack and pinion mechanism can be accomplished.

The rack 7 is coaxially passed through an electric motor 10. More specifically, the rack 7 is passed through a hollow rotor having a drive helical gear 11 which meshes with a driven helical gear 13 mounted to an axial end of a screw shaft 12 of a ball screw mechanism extending in parallel with the rack 7. A nut 14 of the ball screw mechanism is fixedly secured to the rack 7.

The steering shaft 4 is provided with a torque sensor 16 for producing a signal corresponding to a steering torque applied to the steering shaft 4. The vehicle body carries a lateral acceleration sensor 17 for producing a signal corresponding to the lateral acceleration applied to the vehicle body, a yaw rate sensor 18 for producing a signal corresponding to the yaw rate (angular speed of the yawing movement) of the vehicle body, and a vehicle speed sensor 19 for producing a signal corresponding to the traveling speed of the vehicle.

In this embodiment, the steering wheel 3 and the steerable wheels or the front wheels 9 are mechanically connected to each other, and a control signal obtained by processing the outputs from the various sensors 16 through 19 is supplied to the electric motor 10 via a control unit 20 and a drive circuit 21 so that the output torque of the electric motor 10 may be controlled as required.

Figure 2:
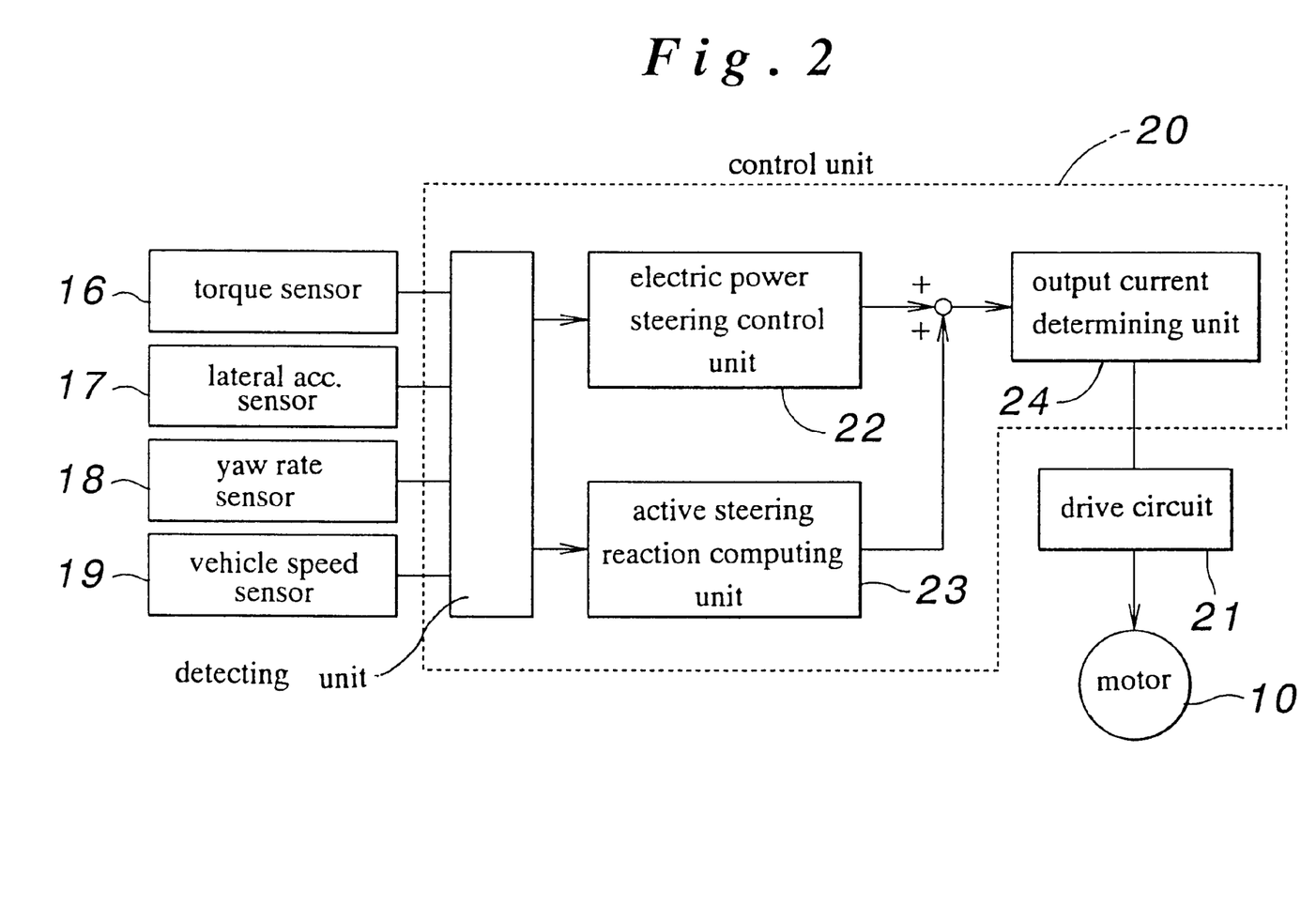
FIG. 2 is a block diagram showing the general structure of the vehicle steering control system.

FIG. 2 shows a schematic block diagram of a control system to which the present invention is applied. The control unit 20 receives the outputs from the steering torque sensor 16, the lateral acceleration sensor 17, the yaw rate sensor 18, and the vehicle speed sensor 19. These output signals are fed to an electric power steering control unit 22 and an active steering reaction computing unit 23, and the outputs from these units are supplied to an output current determining unit 24 so that the target electric current level for the electric motor 10 may be determined.

The electric power steering control unit 22 carries out the control for the normal power assist for the manual steering input for the steerable front wheels 9. This control unit 22 may be capable of determining the target actuating torque according to the lateral acceleration and the yaw rate.

The active steering reaction computing unit 23 computes the target steering reaction actuating torque according to an algorithm which is described hereinafter. The output current determining unit 24 determines the target driving current signal which is proportional to or otherwise corresponds to the deviation of the actual steering torque obtained from the torque sensor 16 from the target steering torque value. The target driving current signal is however opposite in sign to the deviation.

The target drive current value thus obtained is supplied to the drive circuit 21. This drive circuit 21 controls the electric motor 10, for instance by PWM control, and an actually detected current value obtained from a current detection sensor is fed back to the input signal to the drive circuit 21 or to the target drive current value.

Figure 3:
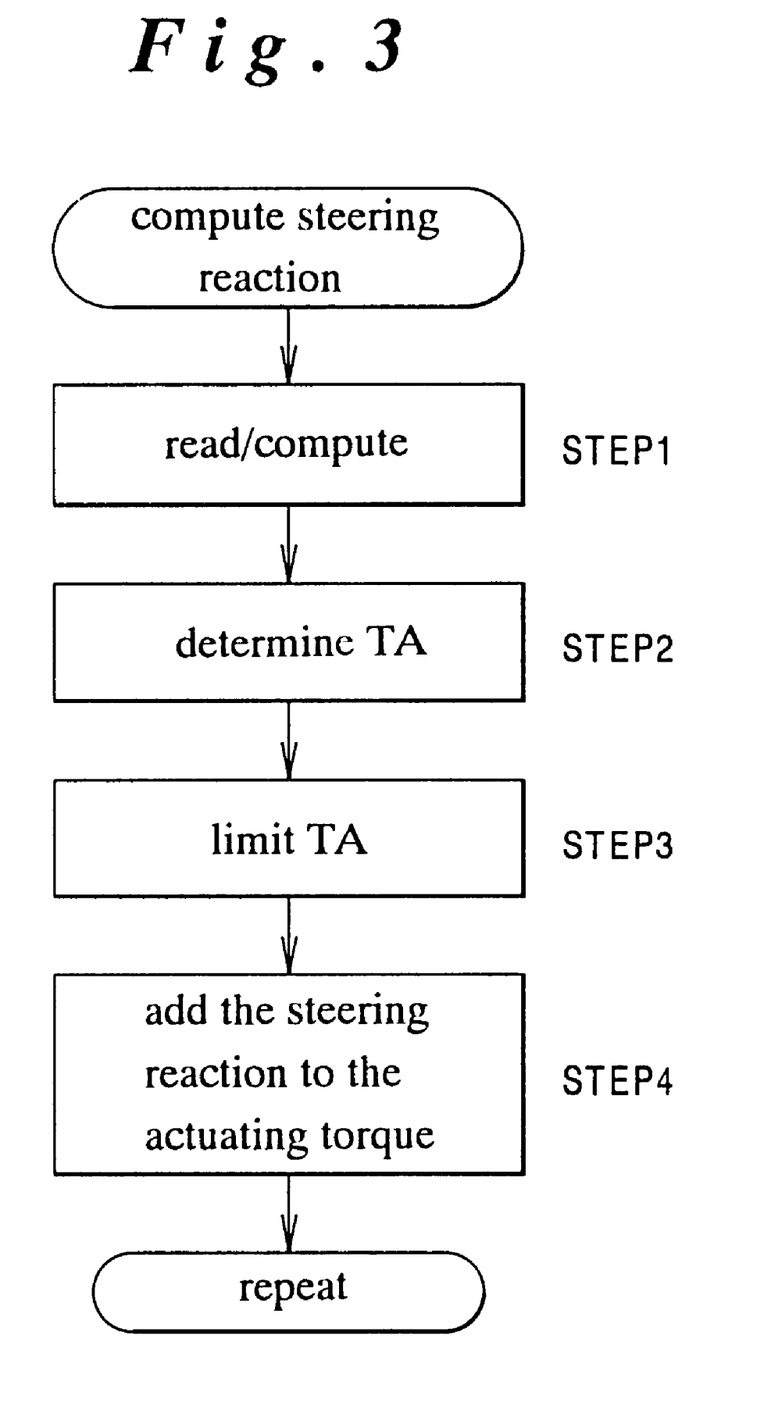
FIG. 3 is a flow chart showing the main control flow of the vehicle steering control system.

In the active steering reaction computing unit 23 in the control unit 20, the process shown by the flow chart of FIG. 3 is cyclically executed at a prescribed period. First of all, in step 1, the output signals from the various sensors are read out, and the yaw acceleration is computed. In step 2, the target steering reaction TA is determined. A limit is set on the target steering reaction in step 3, and this control signal is added to the output of the electric power steering control unit 22 in step 4.

Figure 4:
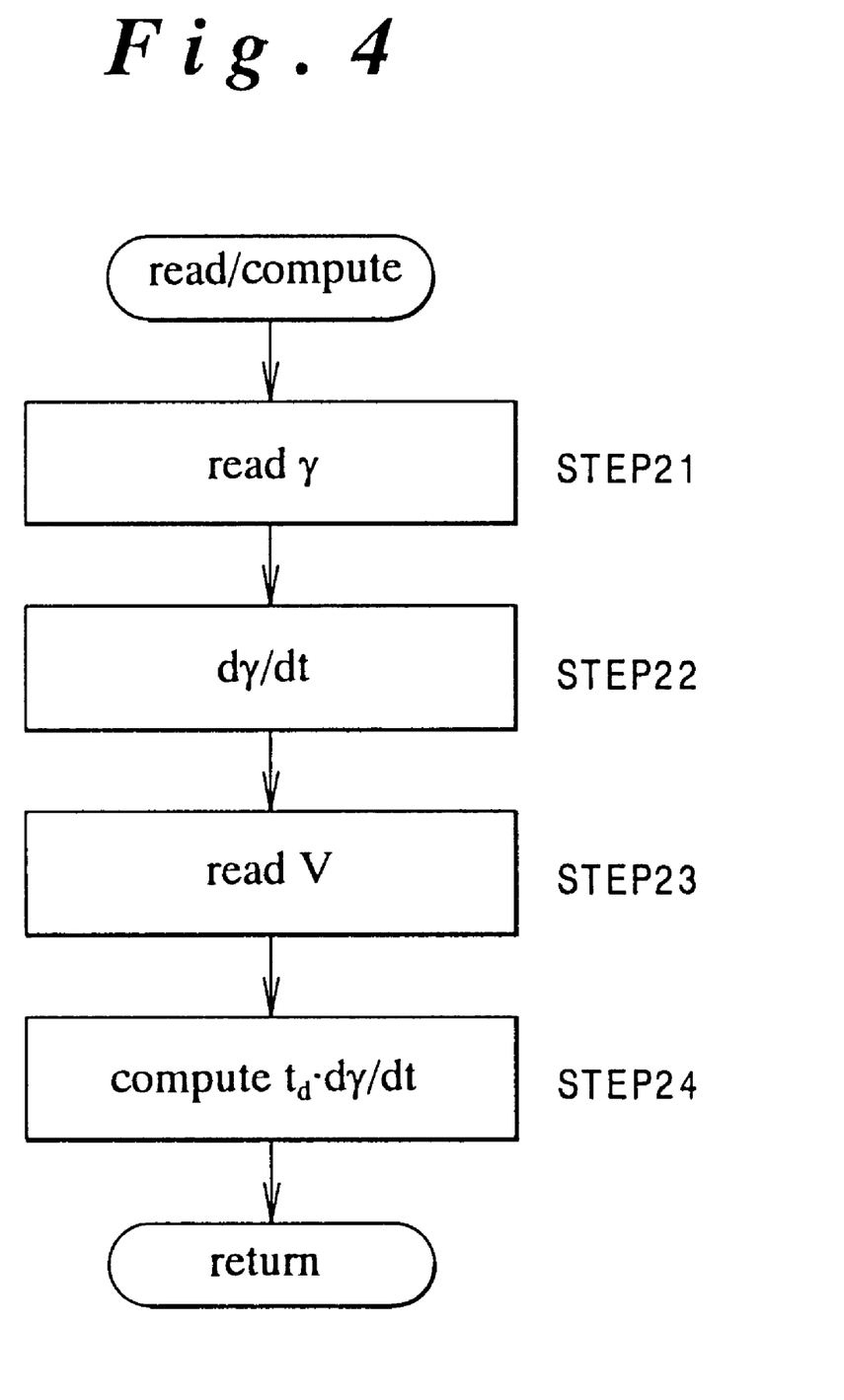
FIG. 4 is a flow chart showing step 1 of FIG. 3 in more detail.
Figure 8:
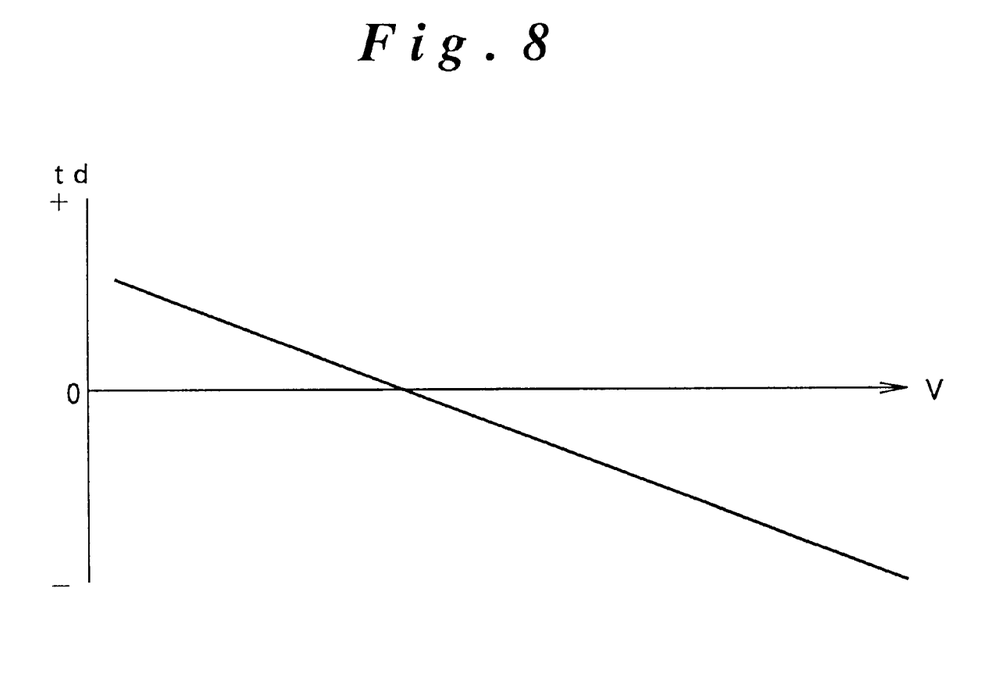
FIG. 8 shows a graph representing the dependence of the coefficient $t_d$ on the vehicle speed V.

This control process is described in more detail with reference to FIGS. 4 through 7. With reference to FIG. 4, step 1 includes the following sub steps. First of all, the current actual yaw rate γ is read (step 21), and the current yaw acceleration dγ/dt is computed by differentiating the current actual yaw rate γ (step 22) with time. Then, the vehicle speed V is read (step 23), and a coefficient $t_d$ is read from a data table by using the vehicle speed V as the index or the address (step 24) to obtain a computed yaw rate $t_d \cdot d\gamma/dt$. The coefficient $t_d$ diminishes linearly with the increase in the vehicle speed V, and is positive in a low speed range but becomes negative beyond a certain vehicle speed as shown in FIG. 8.

Figure 5:
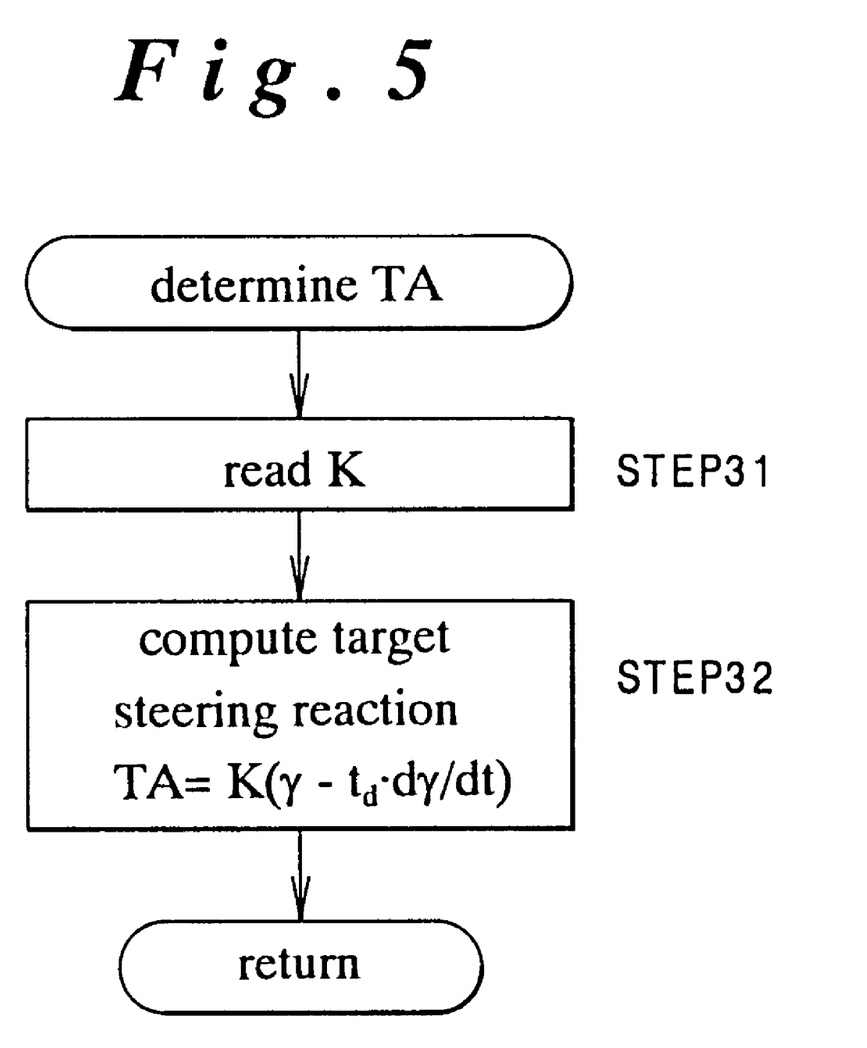
FIG. 5 is a flow chart showing step 2 of FIG. 3 in more detail.

With reference to FIG. 5, step 2 includes the following sub steps. A reaction coefficient K is read from a data table by using the vehicle speed as the index or the address (step 31), and a target steering reaction torque TA is computed from the following relationship (step 32).

$$TA = K(\gamma - t_d \cdot d\gamma/dt)$$

Figure 9:
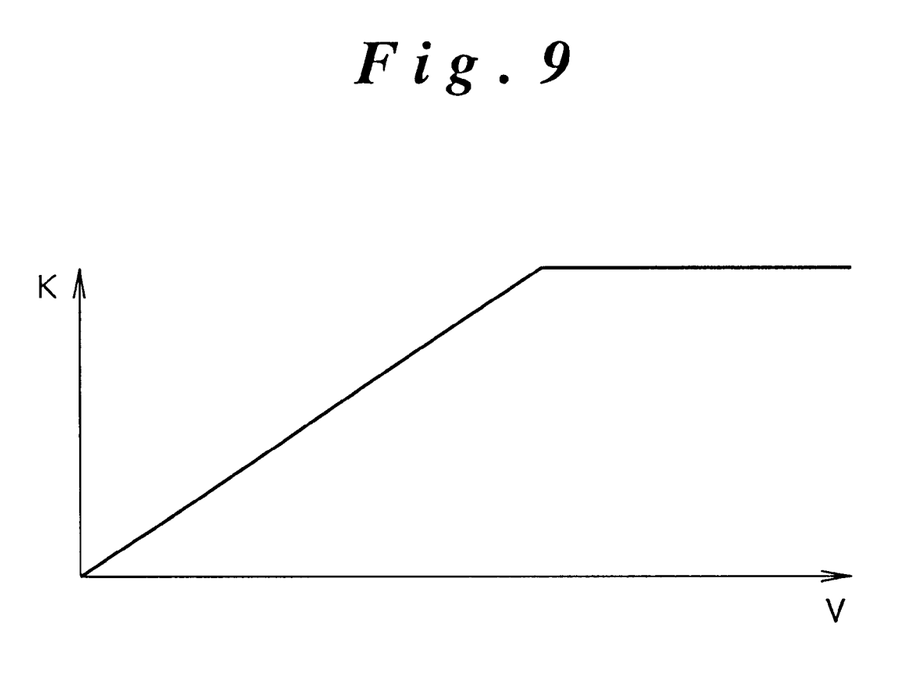
FIG. 9 shows a graph representing the dependence of the coefficient K on the vehicle speed V.

In this case, the coefficient K consists of a linear function which increases with the increase in the vehicle speed V, but assumes a constant value beyond a certain vehicle speed level as shown in FIG. 9. This accounts for the fact that the influences of external disturbances progressively increase with the vehicle speed, and it is appropriate to increase the magnitude of the steering reaction with the increase in the vehicle speed.

Figure 6:
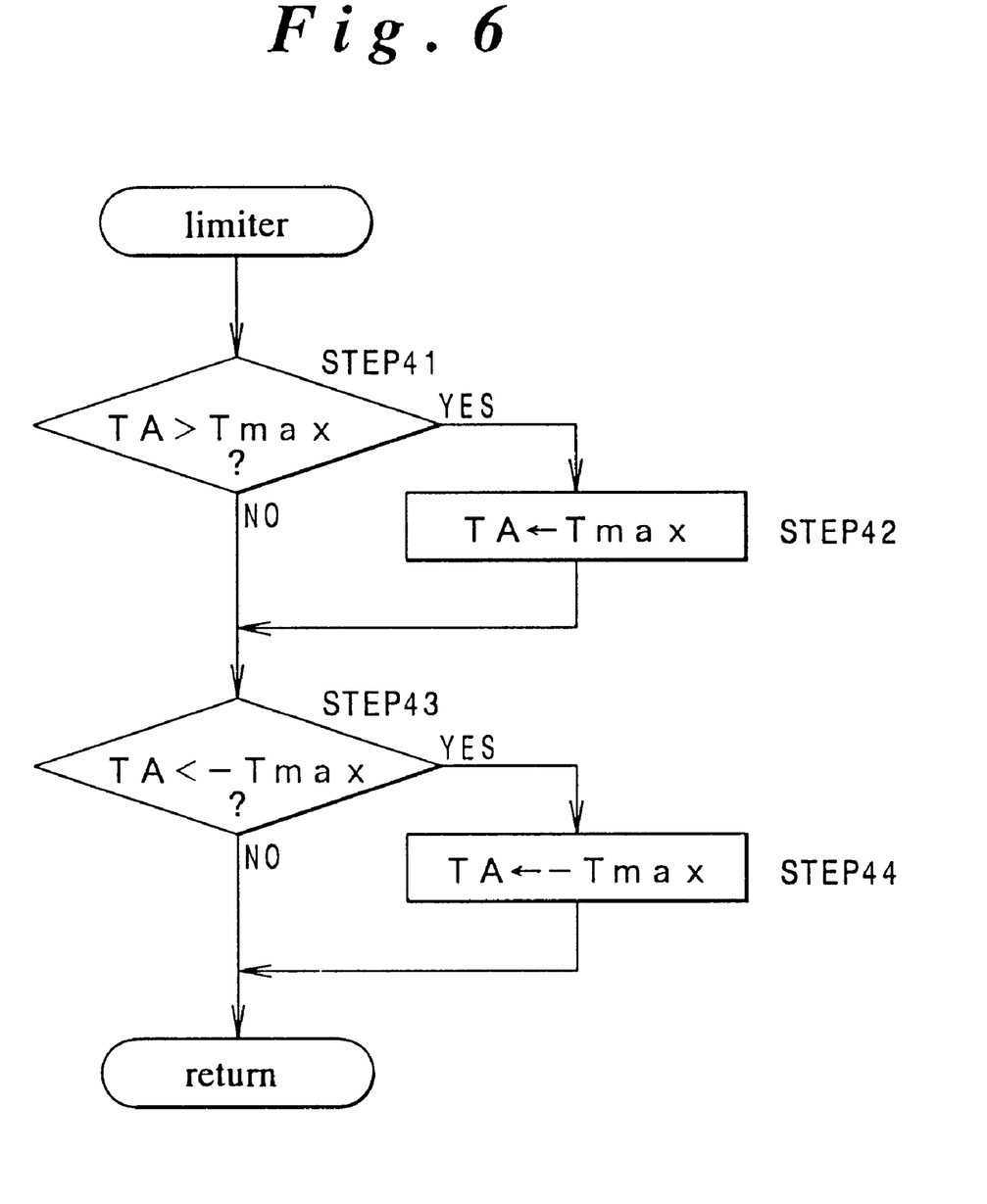
FIG. 6 is a flow chart showing step 3 of FIG. 3 in more detail.
Figure 7:
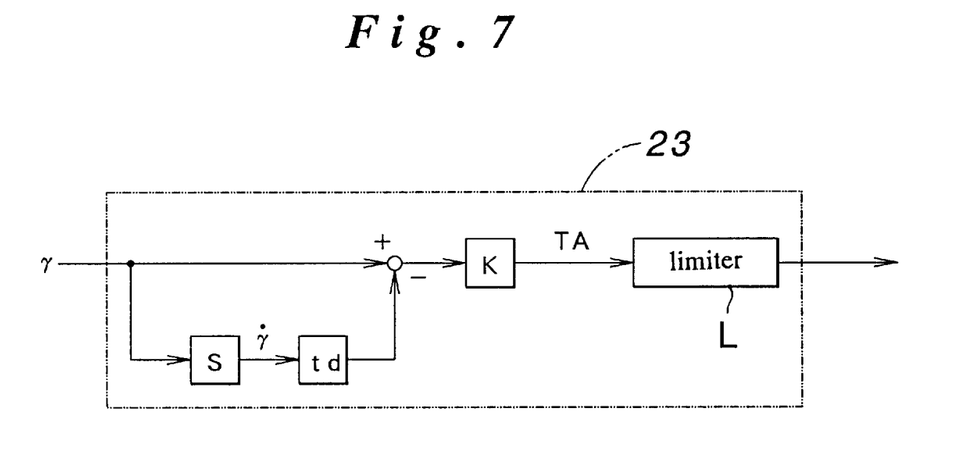
FIG. 7 is a block diagram showing the active steering reaction computing unit 23 of FIG. 2 in more detail.

Step 3 is carried out as shown in FIG. 6. This process corresponds to the action of the limiter L in FIG. 7. First of all, it is determined whether the target steering reaction TA has exceeded a prescribed level Tmax (step 41), and if that is the case, the target steering reaction TA is set at the prescribed maximum level Tmax (step 42). If the target steering reaction TA is lower than this prescribed level Tmax, it is likewise determined whether the target steering reaction TA has fallen below another prescribed level –Tmax (step 43). If the target steering reaction TA is lower than this prescribed level –Tmax, the target steering reaction TA is set at the prescribed minimum level –Tmax (step 44). In short, a limit is imposed on TA so that the absolute value of the target steering reaction TA would not exceed Tmax.

The target steering reaction TA thus determined is added to the target assisting actuating torque, and the sum is converted into a target electric current level by the output current determining unit 24 to be supplied to the drive circuit 21.

As shown in FIG. 8, the coefficient td is negative in value in a high speed range, and the absolute value of the coefficient td progressively increases with the increase in the vehicle speed in the high speed range. Thus, in a high speed range, the yaw acceleration contributes significantly to the reaction steering torque which tends to reduce the yaw rate of the vehicle. This is appropriate because the yaw rate response for a given external disturbance increases with the vehicle speed, and the reaction steering torque should be accordingly increased with the increase in the vehicle speed. Also, some increase in the steering effort is favorable in a high speed range because it tends to stabilize the behavior of the vehicle.

The coefficient $t_d$ is positive in value in a low speed range, and the absolute value of the coefficient $t_d$ progressively increases with the decrease in the vehicle speed in the low speed range. Thus, in a low speed range, the yaw acceleration is effective in reducing the steering reaction torque which tends to reduce the yaw rate of the vehicle. This is appropriate because the vehicle behavior is relatively immune to external disturbances in a lower speed range, and reducing the effort required to turn the steering wheel is more important.

As shown in FIG. 9, the coefficient K in this embodiment is substantially proportional to the vehicle speed V, but assumes a constant value beyond a certain intermediate speed. The coefficient K, as well as the coefficient $t_d$, can be defined as a mathematical function of the vehicle speed in such a manner that an optimum handling of the vehicle may be achieved.

Thus, for instance, when the vehicle deviates from the intended straight path due to crosswind, the electric motor 10 is actuated to a degree depending on the magnitudes of the actual yaw rate $\gamma$ and the computed yaw rate $t_d \cdot d\gamma/dt$, and the resulting steering reaction tends to reduce the actual yaw rate $\gamma$ without regard to the steering effort applied by the vehicle operator. In particular, both the yaw rate and the change rate of the yaw rate contribute to the generation of an actuating steering torque which tends to reduce the yaw rate. Therefore, even when a yaw rate $\gamma$ is produced as a result of external disturbances such as crosswind and the vehicle operator does not apply any steering effort to the steering wheel, the front wheels 9 are automatically steered so as to restore the vehicle back to the straight ahead condition, and the vehicle is prevented from any irregular behaviors.

When the vehicle is making a turn without involving any substantial external interferences, some yaw rate is produced, but because the yaw acceleration $d\gamma/dt$ is either extremely small or zero and the target steering reaction torque produced by the electric motor 10 becomes accordingly small, the steering system produces an assist steering torque substantially in the same way as a normal power steering system, and the vehicle operator can comfortably operate the vehicle during the entire turning maneuver.

When the vehicle operator rapidly turns the steering wheel 3, the yaw acceleration $d\gamma/dt$ may become accordingly large. If the vehicle speed is high, because the coefficient $t_d$ is negative in value, the yaw acceleration of the vehicle acts in the direction to increase the target steering reaction torque TA which opposes the manual steering effort, and prevents the steering wheel from being turned rapidly. As a result, the stability of the vehicle is improved. This is advantageous in a high speed range because the vehicle is sensitive to external disturbances, and the stability of the vehicle is particularly important.

If the vehicle speed is low, because the coefficient $t_d$ is positive in value, the target steering reaction torque TA is directed in the same direction as the manual steering torque, and the effort required by the vehicle operator is favorably diminished. This is advantageous in a low speed range because external disturbances would not produce any significant effect and the maneuverability of the vehicle is far more important.

If the vehicle encounters external disturbances during a steady turning maneuver, because the yaw rate changes rapidly and the yaw acceleration increases, a correspondingly large target steering reaction torque TA is produced, and the irregular behaviors of the vehicles can be avoided. By appropriately defining the values of K and $t_d$ as mathematical functions of the vehicle speed, it is possible to produce a target steering reaction torque TA which matches the properties of the vehicle.

Thus, according to the present invention, the actuating torque that tends to control the lateral movement of the vehicle is applied to the steerable wheels and the irregular lateral movement of the vehicle due to external interferences such as crosswind can be effectively controlled without requiring any efforts on the part of the vehicle operator. In particular, because the transfer function used for obtaining the reference yaw rate consists of a first-order delay function, the steering effort by the vehicle operator is not unduly increased even when the steering wheel is turned briskly. The vehicle equipped with this steering control system therefore demonstrates a highly stable behavior in following a straight course. In short, by proper selection of the parameters, it is possible to achieve both a favorable stability of the vehicle in its cruising condition and an appropriate level of steering reaction during normal turning maneuvers.

Although the present invention has been described in terms of a specific embodiment thereof, it is possible to modify and alter details thereof without departing from the spirit of the present invention. For instance, the yaw rate is substantially equivalent to the lateral acceleration of the vehicle, and the lateral acceleration of the vehicle may be used instead of the yaw rate in implementing the present invention, if necessary, with appropriate modifications.

What we claim is:

1. A vehicle steering control system, comprising:
   manual steering torque input means for manually applying a manual steering torque to steerable wheels of a vehicle;
   powered steering actuator means for applying an actuating steering torque to said steerable wheels of said vehicle;
   a yaw rate sensor for detecting a yaw rate of said vehicle; and
   control means for controlling said actuating steering torque according to said detected yaw rate so that
     said actuating steering torque is dependent on said detected yaw rate and a change rate of said detected yaw rate in such a manner that said detected yaw rate always contributes to said actuating steering torque so as to reduce said detected yaw rate, and said change rate of said detected yaw rate contributes to said actuating steering torque so as to reduce said detected yaw rate in a high speed range but so as to increase said detected yaw rate in a low speed range.

2. A vehicle steering control system according to claim 1, wherein said actuating steering torque includes a component given by $K(\gamma - t_d \cdot d\gamma/dt)$, where $\gamma$ is said detected yaw rate, K and $t_d$ are coefficients which depend on a vehicle speed, and d/dt denotes a time derivative.

3. A vehicle steering control system according to claim 2, wherein said coefficient $t_d$ is positive in value in a low speed range, and substantially linearly decreases with said vehicle speed, becoming negative at a certain intermediate vehicle speed.

4. A vehicle steering control system according to claim 3, wherein said coefficient K substantially linearly increases with said vehicle speed, and assumes a substantially constant value beyond a certain vehicle speed.

5. A vehicle steering control system according to claim 2, wherein said coefficient K substantially linearly increases with said vehicle speed, and assumes a substantially constant value beyond a certain vehicle speed.

6. A vehicle steering control system, comprising:

manual steering torque input means for manually applying a manual steering torque to steerable wheels of a vehicle;

powered steering actuator means for applying an actuating steering torque to said steerable wheels of said vehicle;

means for detecting a lateral dynamic condition of said vehicle; and control means for controlling said actuating steering torque according to said detected lateral dynamic condition so that said actuating steering torque is dependent on said detected lateral dynamic condition and a change rate of said detected lateral dynamic condition in such a manner that said detected lateral dynamic condition contributes to said actuating steering torque so as to reduce said detected lateral dynamic condition, and said change rate of said detected lateral dynamic condition contributes to said actuating steering torque so as to reduce said detected lateral dynamic condition in a high speed range and so as to increase said detected lateral dynamic condition in a low speed range.

7. A vehicle steering control system according to claim 6, wherein a component of said actuating steering torque is determined based on a difference between said detected lateral dynamic condition and a reference lateral dynamic condition obtained using a first order transfer function.

8. A vehicle steering control system according to claim 7, wherein said component of said actuating steering torque is given by $K(\gamma - t_d \cdot d\gamma/dt)$, where $\gamma$ is said detected lateral dynamic condition, K and $t_d$ are coefficients which depend on a vehicle speed, and d/dt denotes a time derivative.

9. A vehicle steering control system according to claim 8, wherein said coefficient $t_d$ is positive in a low speed range, and substantially linearly decreases with said vehicle speed, becoming negative at a certain intermediate vehicle speed.

10. A vehicle steering system according to claim 8, wherein said coefficient K substantially linearly increases with said vehicle speed, and assumes a substantially constant value beyond a certain vehicle speed.

11. A vehicle steering control system according to claim 6, wherein a component of said actuating steering torque is determined based on a difference between said detected lateral dynamic condition and a reference lateral dynamic condition computed from said change rate of said detected lateral dynamic condition.

12. A vehicle steering control system according to claim 11, wherein said component of said actuating steering torque is given by $K(\gamma - t_d \cdot d\gamma/dt)$, where $\gamma$ is said detected lateral dynamic condition, K and $t_d$ are coefficients which depend on a vehicle speed, and d/dt denotes a time derivative.

13. A vehicle steering control system according to claim 12, wherein said coefficient $t_d$ is positive in a low speed range, and substantially linearly decreases with said vehicle speed, becoming negative at a certain intermediate vehicle speed.

14. A vehicle steering system according to claim 12, wherein said coefficient K substantially linearly increases with said vehicle speed, and assumes a substantially constant value beyond a certain vehicle speed.

15. A vehicle steering control system, comprising:

manual steering torque input means for manually applying a manual steering torque to steerable wheels of a vehicle;

powered steering actuator means for applying an actuating steering torque to said steerable wheels of said vehicle;

means for detecting a lateral dynamic condition of said vehicle; and control means for controlling said actuating steering torque according to said detected lateral dynamic condition so that the actuating steering torque is dependent on a difference between said detected dynamic condition and a reference lateral dynamic condition computed from a change rate of said detected lateral dynamic condition.

16. A vehicle steering control system according to claim 15, wherein said reference yaw rate is computed as the product of said change rate of said detected lateral dynamic condition and a coefficient having a value which changes dependent on vehicle speed.

17. A vehicle steering control system according to claim 16, wherein said coefficient is variable such that the change rate of said detected lateral dynamic condition contributes to said actuating steering torque so as to reduce said detected lateral dynamic condition in a high speed range and so as to increase said detected lateral dynamic condition in a low speed range.

18. A vehicle steering control system according to claim 15, wherein a component of said actuating steering torque is given by $K(\gamma - t_d \cdot d\gamma/dt)$, where $\gamma$ is said detected lateral dynamic condition, K and td are coefficients which depend on a vehicle speed, and d/dt denotes a time derivative.

* * * * *

UNITED STATES PATENT AND TRADEMARK OFFICE
CERTIFICATE OF CORRECTION

PATENT NO : 6,108,599
DATED : 22 August 2000
INVENTOR(S) : Yorihisa Yamamoto, Yutaka Nishi, Takashi Nishimori, Hiroyuki Tokunaga, Hideki Machino It is certified that error appears in the above-identified patent and that said Letters Patent are hereby corrected as shown below:

On the cover page, in the "[57] ABSTRACT", 3rd line, change "y is" to --$\gamma$ is--.

Column 4, line 62, change "td" to --$t_d$--;

line 64, change "td" to --$t_d$--.

Signed and Sealed this

Twenty-fourth Day of April, 2001

Attest:

NICHOLAS P. GODICI

Attesting Officer

Acting Director of the United States Patent and Trademark Office